(12) United States Patent
Watanabe et al.

(10) Patent No.: US 7,706,037 B2
(45) Date of Patent: Apr. 27, 2010

(54) FABRICATION PROCESS FOR CHOLESTERIC LIQUID CRYSTAL MEDIA HAVING A VOLUME HOLOGRAM

(75) Inventors: Masachika Watanabe, Tokyo (JP); Masanori Umeya, Tokyo (JP); Koji Eto, Tokyo (JP); Tsuyoshi Yamauchi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 12/436,993

(22) Filed: May 7, 2009

(65) Prior Publication Data
US 2009/0219592 A1 Sep. 3, 2009

Related U.S. Application Data

(62) Division of application No. 11/517,330, filed on Sep. 8, 2006, now Pat. No. 7,545,545.

(30) Foreign Application Priority Data
Sep. 22, 2005 (JP) .............................. 2005-276161

(51) Int. Cl.
*G03H 1/00* (2006.01)
*G02B 5/32* (2006.01)
(52) U.S. Cl. ................................ 359/2; 359/15; 359/22
(58) Field of Classification Search .................... 359/1, 359/2, 15, 22; 349/115; 356/457
See application file for complete search history.

(56) References Cited

U.S. PATENT DOCUMENTS

| 6,061,122 | A | 5/2000 | Hoshino et al. |
| 6,266,113 | B1 * | 7/2001 | Yamazaki et al. ........... 349/115 |
| 7,388,627 | B2 | 6/2008 | Hoshino et al. |
| 2007/0097299 | A1 | 5/2007 | Watanabe et al. |

* cited by examiner

*Primary Examiner*—Charlie Peng
(74) *Attorney, Agent, or Firm*—Sughrue Mion, PLLC

(57) ABSTRACT

The invention provides a process capable of fabricating a cholesteric liquid crystal medium having a volume hologram with efficiency yet without recourse to complicated steps such as an alignment step. This is achievable as follows. A volume hologram layer is formed on a substrate, and a cholesteric liquid crystal layer is then formed on another substrate comprising a center substrate film that is subjected to bondable treatment. The volume hologram layer is applied to the center substrate film that is subjected to bondable treatment, and placed in a state where the volume hologram layer and cholesteric liquid crystal layer are laminated together via the substrate. The substrate is peeled off the volume hologram layer, and an adhesive layer is formed on the surface of the volume hologram layer off which the substrate is peeled off, followed by the provision of the substrate on the adhesive layer. Finally, the multilayer structure is shaped into a label form of cholesteric liquid crystal medium having a volume hologram layer.

2 Claims, 8 Drawing Sheets

---

| cholesteric liquid crystal |
|---|
| bondable PET film | multilayer structure 1

Formation of the hologram layer:
Substrate 1/Hologram 2

Formation 1 of the CLC layer:
Bondable PET 4/CLC layer 3

Formation 2 of the CLC layer:
Substrate 6/Release Layer 5/CLC Layer 3

Lamination 1:
Substrate 1/Hologram 2/Bondatable PET 4/CLC Layer 3

Lamination 2:
Substrate 6/Release Layer 5/CLC Layer 3/Primer Layer 7/
Hologram 2/Substrate 1

Processing into Label:
Substrate 9/Adhesive Layer 8/Bondable PET 4/CLC Layer 3

Processing into Transfer Foil:
Substrate 6/Release Layer 5/CLC Layer 3/Primer Layer 7/
Hologram 2/Heat Seal Layer 10 multilayer structure 1 multilayer structure 2 multilayer structure 3 multilayer structure 4 cholesteric liquid crystal medium having a volume hologram 1 multilayer structure 5 multilayer structure 6 cholesteric liquid crystal medium having a volume hologram 2

FABRICATION PROCESS FOR CHOLESTERIC LIQUID CRYSTAL MEDIA HAVING A VOLUME HOLOGRAM

This is a divisional of application Ser. No. 11/517,330 filed Sep. 8, 2006, which claims priority to Japanese Application No. 2005-276161 filed Sep. 22, 2005. The entire disclosure of the prior applications are hereby incorporated by reference.

BACKGROUND ART

The present invention relates to configuring or otherwise processing an authentication medium into a label or transfer foil form suited for use on articles or objects, wherein said authentication medium can tell from what is obtained from it by illegal copying, doctoring, etc. For instance, credit cards, bank cards, prepaid cards, commutating passes, bankbooks, passports, and ID cards, all likely to incur hassles when illegally copied, doctored and used, should desirously have an authentication function by themselves. In addition, music, image, game or computer software recorded in media, and throw-away supplies for printers, which used to be illegally copied, too, should desirously have an authentication function. So far, much use has been made of holograms for the purpose of authenticating various objects including the above goods or articles.

Patent Publication 1 (JP(A)2004-230571) shows a hologram label characterized by comprising a multilayer assembly wherein an adhesive layer, a light reflective layer, a printed primer layer and a printed layer are successively stacked on one surface of a thermally shrinkable substrate film, and an adhesive layer and a release sheet are successively stacked on another surface.

Patent Publication 2 (JP(A)11-151877) discloses an authentication medium adapted to be provided on an object in an optically visible way to authenticate said object, characterized by comprising a hologram having a cholesteric liquid crystal polymer on a reflective layer.

DISCLOSURE OF THE INVENTION

Such a hologram as disclosed in Patent Publication 1 can be reconstructed by simple reconstruction illumination light or white light, and so it is not necessarily difficult to forge it by means of copying or the like. Once the hologram has been forged, it would be fairly difficult to tell the genuine hologram from the forged one because of its sophistication. For this reason, the security of a label, seal or the like comprising such a hologram is still far away from impeccability.

To make sure security that is ever higher than could be possible with such a simple hologram, Applicant has developed a label (cholesteric liquid crystal medium having a volume hologram) that combines the function of a hologram with the authentication function of circular polarization of a cholesteric liquid crystal layer.

It is noted that the "liquid crystal layer" used here means a layer having a liquid crystal property in an optical sense, and includes every phase state from a liquid crystal phase having fluidity to a solid phase that is solidified while the molecules of a liquid crystal line up as they stand.

The label that combines the function of a hologram with the authentication function of circular polarization of a cholesteric liquid crystal is briefly now described. Such a label has primarily a double-layer structure of a volume hologram layer and a cholesteric liquid crystal layer. In the volume hologram layer wherein, for instance, a volume hologram-recording material is coated on a suitable support film, interference fringes corresponding to the wave front of light coming from an object is recorded in the layer in the form transmittance or refractive index modulation. A copy can also be easily obtained by exposure and development while a recording material is in close contact with a volume hologram master. Known volume hologram-recording materials such as silver halide materials, dichromated gelatin emulsions, photopolymerizable resins, and photo-crosslinking resins are usable, although particular preference is given to photosensitive materials used for recording a dry type volume phase hologram, which comprises a matrix polymer, a photopolymerizable compound, a photopolymerization initiator and a sensitizing dye. In terms of the physical sequence of liquid crystal molecules, the cholesteric liquid crystal layer has a spiral structure wherein the direction of the directors (molecular major axis) of liquid crystal molecules rotates continuously in the thickness direction of the liquid crystal layer, and has a polarized light separation function of making a separation between a circularly polarized light component in one direction and a circularly polarized light component in the opposite direction based on such a physical sequence of liquid crystal molecules. In other words, natural light incident on such a cholesteric liquid crystal layer is separated into two, right-handed and left-handed, circularly polarized light components, one of which is transmitted, and another is reflected. This phenomenon is known as circular dichroism where if the spiral direction of liquid crystal molecules in a spiral structure is appropriately selected, a circularly polarized light component having the same optical rotating direction as that spiral direction is selectively reflected. For the material for the cholesteric liquid crystal layer, for instance, use could be made of three-dimensionally crosslinkable, polymerizable monomer molecules or polymerizable oligomer molecules. As the polymerizable monomer or oligomer molecules are converted into a liquid crystal layer at a given temperature, it allows them to be placed in a nametic state. However, if any chiral agent is added here, there is then a chiral-nematic liquid crystal (cholesteric liquid crystal) obtained. In this state, if polymerization is initiated by the previously added photoinitiator and extraneously irradiated ultraviolet radiation or if direct polymerization is initiated by electron radiation, liquid crystal molecules in the cholesteric liquid crystal layer in a liquid crystal phase state are three-dimensionally crosslinked (polymerized) and cured, so that they can be solidified in the form of a solid phase state cholesteric liquid crystal layer.

The thus obtained label having a double-layer structure of a volume hologram layer and a cholesteric liquid crystal layer can be used for authentication as is the case with a conventional hologram, because it is seen in changing colors or three-dimensionally. Further, such a cholesteric liquid crystal layer, too, is put over the volume hologram layer. For instance, when the label is view through spectacles comprising a sheet polarizer that transmits right-handed circularly polarized light and a sheet polarizer that transmits left-handed circularly polarized light, there is a phenomenon wherein the light reflected from the label can be viewed through one sheet polarizer but it cannot through another sheet polarizer. Authentication thus becomes much more reliable.

Patent Publication 2 discloses a hologram medium adapted to authenticate whether or not an object is genuine, wherein a high-molecular cholesteric liquid crystal is provided on a reflective layer. However, the hologram set forth in Patent Publication 2 is of a relief type having a structure wherein the cholesteric liquid crystal layer is applied as its reflective layer. That hologram requires complicated alignment at the time of lamination during fabrication, and so is inferior in terms of productivity.

The present invention has for its object to provide a solution to problems about the productivity of such security media as described above. The invention of claim 1 is directed to a fabrication process for a cholesteric liquid crystal medium having a volume hologram, which has a double-layer structure of a volume hologram layer and a cholesteric liquid crystal layer, characterized by comprising the steps of forming a volume hologram layer on a first substrate; forming a cholesteric liquid crystal layer on a bondable substrate; applying said volume hologram layer on a surface of said bondable substrate having no said cholesteric liquid crystal layer applied thereon; peeling said first substrate off; forming an adhesive layer on a surface of said volume hologram layer, off which said first substrate has been peeled; and providing a third substrate on said adhesive layer.

The invention of claim 2 is directed to a fabrication process for a cholesteric liquid crystal medium having a volume hologram, which has a double-layer structure of a volume hologram layer and a cholesteric liquid crystal layer, characterized by comprising the steps of forming a volume hologram layer on a first substrate; forming a cholesteric liquid crystal layer on a bondable substrate; applying said volume hologram layer on a surface of said bondable substrate having no said cholesteric liquid crystal layer applied thereon; peeling said first substrate off; forming a heat seal layer on a surface of said volume hologram layer, off which said first substrate has been peeled; and providing a third substrate on said adhesive layer.

The invention of claim 3 is directed to a fabrication process for a cholesteric liquid crystal medium having a volume hologram, which has a double-layer structure of a volume hologram layer and a cholesteric liquid crystal layer, characterized by comprising the steps of forming a volume hologram layer on a first substrate; forming a release layer on a second substrate; forming a cholesteric liquid crystal layer on said release layer; forming a primer layer on said cholesteric liquid crystal layer; applying said volume hologram layer on said primer layer; peeling said first substrate off; and forming an adhesive layer on a surface of said volume hologram layer, off which said first substrate has been peeled.

The invention of claim 4 is directed to a fabrication process for a cholesteric liquid crystal medium having a volume hologram, which has a double-layer structure of a volume hologram layer and a cholesteric liquid crystal layer, characterized by comprising the steps of forming a volume hologram layer on a first substrate; forming a release layer on a second substrate; forming a cholesteric liquid crystal layer on said release layer; forming a primer layer on said cholesteric liquid crystal layer; applying said volume hologram layer on said primer layer; peeling said first substrate off; and forming a heat seal layer on a surface of said volume hologram layer, off which said first substrate has been peeled.

According to the present invention, the cholesteric liquid crystal medium having a volume hologram layer, which has a double-layer structure of a volume hologram layer and a cholesteric liquid crystal layer and is of high reliability in terms of security, can be fabricated efficiently without recourse to complicated steps such as an alignment step.

BEST MODE FOR CARRYING OUT THE INVENTION

I. Formation of the Hologram Layer

Figure 1:
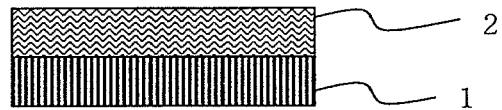
FIG. 1 is illustrative in section of a step of forming a volume hologram layer according to the invention.

Embodiments of the invention are now explained with reference to the accompanying drawing. FIG. 1 is illustrative in section of the steps for the fabrication process of the cholesteric liquid crystal medium having a volume hologram according to the invention. In the fabrication process of the cholesteric liquid crystal medium having a volume hologram according to the invention, there is first a substrate 1 provided at the ready, as shown in FIG. 1. Then, a volume hologram layer 2 is formed on that substrate. There is no particular limitation on the substrate 1 provided that it can receive thereon a hologram layer and has some mechanical strength. For instance, use could be made of PET films, polyvinyl chloride (PVC) films, polyvinylidene chloride films, polyethylene films, polypropylene films, polycarbonate films, cellophane films, acetate films, nylon films, polyvinyl alcohol films, polyamide films, polyamide-imide films, ethylene-vinyl alcohol copolymer films, polymethyl methacrylate (PMMS) films, polyether sulfone films, and polyether ether ketone (PEEK) films. Such a substrate could have an optionally selected thickness, but that thickness is in the range of usually 5 μm to 200 μm, and preferably 10 μm to 50 μm.

For the formation of the volume hologram layer 2, a composition wherein the components, described later, are mixed together is coated on the substrate 1 by means of general coating means such as spin coaters, gravure coaters, comma coaters or bar coaters, and dried if required.

For holographic materials, use could be made of materials known so far to record volume holograms. Specifically, silver halide photosensitive materials, bichromated gelatin, photo-crosslinked type polymers, photopolymers or the like could be used. In particular, the photopolymer is more preferable because of making it possible to fabricate a volume hologram only by use of a dry process and being excellent in terms of mass productivity.

The photopolymer used for holographic materials comprises at least one photopolymerizable compound and a photopolymerization initiator. Now, the components of such a volume hologram recording photopolymer are explained.

1. Photopolymerizable Compound

The photopolymerizable compound used herein is now explained. The photopolymerizable compound used herein could be either a photo-radical polymerizable compound or a photo-cationic polymerizable compound, with reference to which the photopolymerizable compound will be explained.

a. Photo-Radical Polymerizable Compound

There is no particular limitation on the photo-radical polymerizable compound used herein provided that when the volume hologram is formed using the volume hologram-dedicated resin composition of the invention, it polymerizes under the action of an active radical generated from the photo-radical polymerization initiator (described later) by laser irradiation or the like. However, it is preferable to make use of a compound having at least one addition polymerizable ethylenic unsaturated double bond. For instance, use could be made of unsaturated carboxylic acids, unsaturated carboxylic acid salts, esters of unsaturated carboxylic acids with aliphatic polyvalent alcohol compounds, amide bound compounds of unsaturated carboxylic acid with aliphatic polyvalent alcohol compounds. Set out below are specific monomers for the aforesaid esters of unsaturated carboxylic acid with aliphatic polyvalent alcohol compounds.

The acrylic acid ester, for instance, includes ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropy) ether, trimethylolethane triacrylate, hexanediol diacrylate, 1,4-cyclohexanediol diacrylate, tetraethylene glycol diacrylate, pentaeryhthritol diacrylate, pentaerythritol triacrylate, pentaerythritol tetraacrylate, dipentaeryhthritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, 2-phenoxyethyl acrylate, phenol ethoxylate monoacrylate, 2-phenoxyethyl acrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethyoxylated bisphenol A diacrylate, 2-(1-naphthyloxy) ethyl acrylate, o-biphenyl acrylate, 9,9-bis(4-acryloxydiethoxyphenyl)fluorene, 9,9-bis(4-acryloxytriethoxypheny)fluorene, 9,9-bis(4-acryloxydipropoxyphenyl)fluorene, 9,9-bis(4-acryloxyethoxy-3-methylphenyl)fluorene, 9,9-bis(4-acryloxyethoxy-3-ethylphenyl)fluorene, and 9,9-bis-(4-acryloxyethoxy-3,5-dimethyl)fluorene.

Sulfur-containing acrylic compounds could also be used. For instance, use could be made of 4,4'-bis(β-acryloyloxyethylthio)diphenyl ketone, 4,4'-bis (β-acryloyloxyethylthio) diphenyl ketone, 4,4'-bis-(β-acryloyloxyethylthio)3,3',5,5'-tetrabromodiphenyl ketone, and 2,4-bis (β-acryloyloxyethylthio)diphenyl ketone.

For the methacrylic acid ester, for instance, use could be made of compounds wherein, in the compounds mentioned above, the "acrylate", "acryloxy" and "acryloyl" are replaced by "methacrylate", "methacryloxy" and "methacryloyl", respectively.

The above photo-radical polymerizable compounds could be used alone or in combination of two or more.

b. Photo-Cationic Polymerizable Compound

The photo-cationic polymerizable compound used herein is a compound that is subjected to cationic polymerization by Brϕnsted acid or Lewis acid generated by the decomposition of the photo-cationic polymerization initiator (described later) upon receipt of energy. For instance, use could be made of cyclic ethers such as those containing epoxy or oxetane rings, thioethers, and vinyl ethers.

The above epoxy ring-containing compound, for instance, includes polyalkylene glycol diglycidyl ether, bisphenol A diglycidyl ether, glycerin triglycidyl ether, diglycerol triglycidyl ether, diglycidyl hexahydrophthalate, trimethylolpropane diglycidyl ether, allyl glycidyl ether, phenyl glycidyl ether, and cyclohexene oxide.

The above photo-cationic polymerizable compounds could be used alone or in combination of two or more.

Further, the above photo-radical polymerizable compounds and the above photo-cationic polymerizable compounds could be used alone or in combination of two or more.

The volume hologram here is formed of the volume hologram-formation resin composition as follows. For instance, laser is irradiated in the form of the desired image to polymerize the photo-radical polymerizable compound. Then, energy is directed all over the surface to polymerize an uncured substance such as the photo-cationic polymerizable compound. It is noted that the image-formation laser or the like is usually different in wavelength from that energy directed all over the surface; the photo-cationic polymerizable compound used herein is preferably a compound that is kept against polymerization by an image-formation laser or the like.

Such a photo-cationic polymerizable compound is preferably liquid at normal temperature, because the polymerization of the photo-radical polymerizable compound preferably takes place in a composition having a relatively low viscosity.

c. Other Considerations

The photo-polymerizable compound used herein may be applied at a proportion of 10 to 1,000 parts by weight, preferably 10 to 300 parts by weight per 100 parts by weight of the binder to be described later.

Referring here to the volume hologram, for instance, the photo-polymerizable compound is polymerized by laser light, light of good coherence or the like to form interference fringes, thereby forming an image. Accordingly, when the volume hologram-formation resin composition contains the photo-radical polymerizable compound and the photo-cationic polymerizable compound, they are selected from compounds having different refractive indices, and which compound has a higher reference index does not matter. In view of material selection, however, it is preferable that the average refractive index of the photo-radical polymerizable compound is higher than that of the photo-cationic polymerizable compound. specifically, it is preferable that there is an average refractive index difference of at least 0.02. This could be because when the average refractive index difference between the photo-radical polymerizable compound and the photo-cationic polymerizable compound is below the above value, there is a possibility that refractive index modulation may become insufficient, rendering it difficult to form a high-definition image. The "average refractive index" here is understood to mean the average refractive index of a polymer obtained by the polymerization of the photo-cationic polymerizable compound or the photo-radical polymerizable compound, and the "refractive index" here is understood to mean a value obtained by measurement with an Abbe refractometer.

2. Photopolymerization Initiator

The photopolymerization initiator used herein is now explained. In the invention, different photo-polymerization initiators are used depending on the aforesaid photo-polymerizable compound. That is, when the photo-polymerizable compound is the photo-radical polymerizable compound, a photo-radical polymerization initiator must be selected as the photopolymerization initiator, and when the photo-polymerizable compound is the photo-cationic polymerizable compound, a photo-cationic polymerization initiator must be selected as the photo-polymerization initiator. The photo-radical and photo-cationic polymerization initiators are now separately explained.

a. Photo-Radical Polymerization Initiator

There is no particular limitation on the photo-radical polymerization initiator used herein, provided that it can generate an active radical upon irradiation with laser or the like at the time when the volume hologram layer is formed of the volume hologram-formation resin composition, thereby polymerizing the aforesaid photo-radical polymerizable compound. For instance, use could be made of imidazole derivatives, bisimidazole derivatives, N-aryl glycine derivatives, organic azide compounds, titanocenes, aluminate complexes, organic peroxides, N-alkoxypyridinium salts, and thioxanthone derivatives, more specifically, 1,3-di(t-butyldioxycarbonyl)benzophenone, 3,3',4,4'-tetrakis(t-butyldioxycarbonyl)benzophenone, 3-phenyl-5-isooxazolone, 2-mercaptobenzimidazole, bis(2,4,5-triphenyl)imidazole, 2,2-dimethoxy-1,2-diphenylethan-1-one (available from Chiba Specialty Chemicals Co., Ltd. under the trade name of Irgacure 651), 1-hydroxy-cyclohexyl-phenyl-ketone (available from Chiba Specialty Chemicals Co., Ltd. under the trade name of Irgacure 184), 2-benzyl-2-dimethylamino-1-(4-morpholinophenyl)-butanone-1 (available from Chiba Specialty Chemicals Co., Ltd. under the trade name of Irgacure 369, bis($\eta$5-2,4-cyclopentadien-1-yl) -bis(2,6-difluoro-3-(1H-pyrrol-1-yl)-phenyl)titanium (available from Chiba Specialty Chemicals Co., Ltd. under the trade name of Irgacure 784), and so on.

b. Photo-Cationic Polymerization Initiator

There is no particular limitation on the photo-cationic polymerization initiator used herein, provided that it can generate Brønsted acid or Lewis acid upon energy irradiation thereby polymerizing the aforesaid photo-cationic polymerizable compound. When the volume hologram-formation resin composition contains the photo-radical polymerizable compound and the photo-cationic polymerizable compound, it is preferable that the photo-cationic polymerizable compound does not react with light for polymerizing the aforesaid photo-radical polymerizable compound in particular, for instance, laser light or light of good coherence, and is photo-sensitive to energy that is thereafter directed all over the surface. This could be because at the time of polymerization of the aforesaid photo-radical polymerizable compound, the photo-cationic polymerizable compound remains virtually unreacted, allowing the volume hologram to have substantial refractive index modulation.

Specifically, use could be made of sulfonic acid ester, imido sulfonate, dialkyl-4-hydroxysulfonium salt, aryl sulfonic acid-p-nitrobenzyl ester, silanol-aluminum complex, and ($\eta$6-benzene) ($\eta$5-cyclopentadienyl)iron (II). Besides, benzointosylate, 2,5-dinitrobenzyltosylate, N-tosylphthalic acid imide or the like could also be used.

c. Other Considerations

What is used as both the photo-radical and the photo-cationic polymerization initiator in the invention includes aromatic idonium salts, aromatic sulfonium salts, aromatic diazonium salts, aromatic phosphonium salts, triazine compounds, iron arene complexes, and so on. Specific mention is made of chloride, bromide and borofluoride salts of idonium such as diphenyl idonium, ditollyl idonium, bis(p-t-butylphenyl)idonium, bis(p-chlorophenyl)idonium; idonium salts such as hexafluoroantimonate; chloride, bromide and borofluoride salts such as triphenylsulfonium, 4-5-butylphenylsulfonium and tris(4-methylphenyl)sulfonium; sulfonium salts such as hexfluorophosphate and hexafluoroantimonate; and 2,4,6-substituted-1,3,5-triazine compounds such as 2,4,6-tris(trichloromethyl)-1,3,5-triazine, 2-phenyl-4,6-bis(trichloromethyl)-1,3,5-triazine and 2-methyl-4,6-bis(trichloromethyl)-1,3,5-triazine.

The aforesaid photopolymerization initiators could be used alone or in combination of two or more.

Further, the photopolymerization initiator may be used at a proportion of 0.1 to 20 parts by weight, preferably 5 to 15 parts by weight per 100 parts by weight of the binder resin to be described later.

3. Additives

Additives that could be added to the volume hologram-formation resin compositions are now explained.

a. Sensitizing Dye

The volume hologram-formation resin composition here preferably contains a sensitizing dye. The reason is that most of the photo-polymerizable compounds and photo-polymerization initiators are active to ultraviolet radiation, and if the sensitizing dye is added to them, they then become active to visible light, too, making it possible to record interference fringes using visible laser light.

There is no particular limitation on such a sensitizing dye, although it is selected in view of the wavelength of laser light used for the recording of interference fringes. For instance, use could be made of thiopyrylium salt dyes, merocyanine dyes, quinoline dyes, stylylquinoline dyes, coumarin dyes, thioxanthene dyes, xanthene dyes, oxonol dyes, cyanine dyes, rhodamine dyes, pyrylium dyes, cyclopentanone dyes, and cyclohexanone dyes.

For the aforesaid cyanine dyes and merocyanine dyes, 3,3'-dicarbonxyethyl-2,2'-thiocyanine bromide, 1-carboxymethyl-1'-carboxyethyl-2,2'-quinocyanine bromide, 1,3'-diethyl-2,2'-quinothiacyanine iodide, 3-ethyl-5-[(3-ethyl-2(3H)-benzothiazolylidene)ethylidene]-2-thioxo-4-oxazolidine and so on could be mentioned.

For the aforesaid couramin dyes and ketocoumarin dyes, 3-(2'-benzoimidazole)7-N,N-diethylaminocoumarin, 3,3'-carbonylbis(7-diethylaminocoumarin), 3,3'-carbonylbiscoumarin, 3,3'-carbonylbis(5,7-dimethoxycoumarin), 3,3'-carbonylbis(7-acetoxycoumarin) and so on could be mentioned.

Such as when holograms are used as optical elements, photosensitizing dyes having absorption wavelengths in the visible light region are required to have high transparency. In such a case, therefore, it is preferable to use a sensitizing dye that decomposes or breaks down due to post steps, viz., heating or ultraviolet irradiation after the recording of interference fringes, turning into colorless. The aforesaid cyanine dyes are preferable for such a sensitizing dye.

The sensitizing dye may just as well be used at a proportion of 0.01 to 10 parts by weight, preferably 0.01 to 2 parts by weight per 100 parts by weight of the binder resin to be described later.

b. Binder Resin

Preferably in the invention, the volume hologram-formation resin composition contains a binder resin. The reasons are that by the incorporation of the binder resin, film-formation capability and film thickness uniformity can be improved so that the recorded interference fringes can be stably retained in place.

Such a binder resin, for instance, includes polymethacrylic acid ester or its partial hydrolysate, polyvinyl acetate or its hydrolysate, polyvinyl alcohol or its partially acetalized product, triacetyl cellulose, polyisoprene, polybutadiene, polychloroprene, silicone rubber, polystyrene, polyvinyl butyral, polyvinyl chloride, polyarylate, chlorinated polyethylene, chlorinated polypropylene, poly-N-vinylcarbazole or its derivative, poly-N-vinylpyrrolidone or its derivative, and a styrene/maleic anhydride copolymer or its half ester. Copolymers obtained by the polymerization of at least one copolymerizable monomer selected from the group consisting of acrylic acid, acrylic acid ester, methacrylic acid, methacrylic acid ester, acrylamide, acrylnitrile, ethylene, propylene, vinyl chloride, vinyl acetate, etc. could also be used. Besides, copolymers obtained by the copolymerization of monomers having a thermosetting or photo-curable functional group on their side chains could be used. Such binder resins could be used alone or in admixture of two or more.

An oligomer type curable resin could also be used as the binder resin. For instance, epoxy compounds generated by the condensation reactions of various phenol compounds such as bisphenol A, bisphenol S, novolac, o-cresol novolac, and p-alkylphenol novolac with epichlorohydrin could be mentioned.

Further, organic-inorganic hybrid polymers making use of sol-gel reactions, too, could be used as the binder resin. For instance, copolymers of organic metal compounds having a polymerizable group and represented by the following general formula (1) with vinyl monomers could be mentioned.

$$R_m M(OR')_n \quad (1)$$

Here M is a metal such as Si, Ti, Zr, Zn, In, Sn, Al, and Se; R is a vinyl or (meth)acryloyl group having 1 to 10 carbon atoms; and R' is an alkyl group having 1 to 10 carbon atoms with the proviso that m+n is the valency of the metal N.

Exemplary organic metal compounds using Si as the metal N are vinyltriethoxysilane, vinyltrimethoxysilane, vinyltributoxysilane, vinyltriallyloxysilane, vinyltetraethoxysilane, vinyltetramethoxysilane, acryloxypropyltrimethoxysilane, and methacryloxypropyltrimethoxysilane.

For the aforesaid vinyl monomer, acrylic acid, acrylic acid ester, methacrylic acid, methacrylic acid ester or the like could be mentioned.

It is here noted that the volume hologram is a hologram wherein interference fringes are recorded in the form of refractive index modulation or transmittance modulation. Therefore, it is preferable that there is a large refractive index difference between the binder resin and the photopolymerizable compound. To make a large refractive index difference between the binder resin and the photopolymerizable compound according to the invention, an organic metal compound represented by the following general formula (2) could be added into the volume hologram-formation resin composition, too.

$$M(OR'')_k \quad (2)$$

Here, M is a metal such as Ti, Zr, Zn, In, Sn, Al, and Se; R'' is an alkyl group having 1 to 10 carbon atoms; and k is the valency of the metal M.

As the compound represented by the aforesaid formula (2) is added into the volume hologram-formation resin composition, it forms a network structure with the binder resin by way of sol-gel reactions in the presence of water and an acid catalyst. As a result, not only is the refractive index of the binder resin increased, but also the toughness and heat resistance of the film are beefed up. To make the refractive index difference between the binder resin and the photopolymerizable compound large, it is thus preferable to use one having a high refractive index as the metal M.

The aforesaid binder resin is used in the volume hologram-formation resin composition in an amount of usually 15 to 50% by weight, and preferably 20 to 40% by weight.

How to form the volume hologram layer 2 of the invention is now explained.

According to the invention, the volume hologram layer 2 is formed as follows. First, the aforesaid volume hologram-formation resin composition is coated on the substrate 1 by general coating means, and dried if required, into a volume hologram layer.

Then, the aforesaid volume hologram layer is exposed to laser light used with an ordinary holographic aligner or light of good coherence (for instance, light having a wavelength of 300 nm to 1,200 nm) to polymerize the photo-polymerizable compound as mentioned above, thereby recording interference fringes for the desired image. Thus, the volume hologram layer is formed.

If necessary, the aforesaid volume hologram-formation resin composition could be used with a solvent at the time of coating. Such a solvent, for instance, includes acetone, methyl ethyl ketone, methyl isobutyl ketone, cyclohexanone, benzene, toluene, xylene, chloro-benzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, and isopropanol, which could be used alone or in admixture of two or more.

For the coating of the aforesaid volume hologram-formation resin composition, use could be made of various coating techniques such as spin coaters, gravure coaters, comma coaters, and bar coaters.

Although varying depending on the type and application of the volume hologram layer, the aforesaid volume hologram-formation resin composition is coated in an amount of usually 1 g/m² to 100 g/m², and preferably 2 g/m² to 40 g/m², and the volume hologram layer has a thickness of usually 1 μm to 100 μm, and preferably 2 μm to 40 μm. Further, the volume hologram layer 2 formed by the curing of the volume hologram-formation resin composition has a thickness of 1 to 100 μm, and preferably 10 to 40 μm.

As the aforesaid volume hologram layer 2 is exposed to laser light used with an ordinary holographic aligner or light of good coherence (for instance, light having a wavelength of 300 nm to 1,200 nm), it causes the aforesaid photopolymerizable compound to polymerize to record interference fringes for the desired image. For the aforesaid laser light, use could be made of visible laser, for instance, argon ion laser (458 nm, 488 nm, 514.5 nm), crypton ion laser (647.1 nm), helium-neon laser (633 nm), and YAG laser (532 nm).

The aforesaid interference fringes for the image could be recorded by processes so far known in the art. For instance, a master is brought in close contact with the aforesaid volume hologram layer 2, and interference exposure is applied to the substrate film side using visible light or ionizing radiation such as ultraviolet or electron radiation, thereby recording the interference fringes for the image.

In order to promote refractive index modulation or bring the polymerization reactions of the photopolymerizable compound, etc. to completion, it is acceptable to carry out full-exposure to ultraviolet radiation, heating or other optional processing after interference exposure.

II. Formation of the Cholesteric Liquid Crystal Layer

Figure 2:
FIG. 2 is illustrative in section of a step of forming a cholesteric liquid crystal layer according to the invention.
Figure 3:
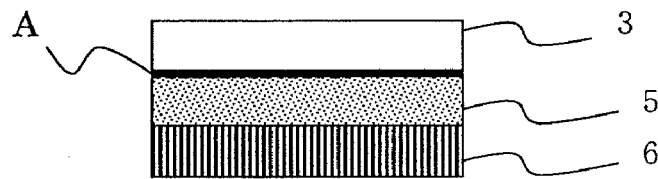
FIG. 3 is illustrative in section of a step of forming a cholesteric liquid crystal layer according to the invention.

Apart from the formation of the volume hologram layer 2, the cholesteric liquid crystal layer 3 is formed. In the fabrication process of the cholesteric liquid crystal medium having a volume hologram according to the invention, a bondable substrate 4 is provided apart from the substrate 1 for the volume hologram layer 2, and the cholesteric liquid crystal layer 3 is formed on it, as shown in FIG. 2. Alternatively, as shown in FIG. 3, a substrate 6 is provided, and the release layer 5 is formed on it for the formation of the cholesteric liquid crystal layer 3.

For the bondable substrate 4, there could be a film used, which comprises a film substrate with its surface or surfaces treated in such a way as to be readily bondable. The film substrate, for instance, includes a PET film, a polyvinyl chloride (PVC) film, a polyvinylidene chloride film, a polyethylene film, a polypropylene film, a polycarbonate film, a cellophane film, an acetate film, a nylon film, a polyvinyl alcohol film, a polyamide film, a polyamide-imide film, an ethylene-vinyl alcohol copolymer film, a polymethyl methacrylate (PMMA) film, a polyether sulfone film, and a polyether ether ketone (PEEK) film. It is preferable to use a PET film with both its surface treated in such a way as to be readily bondable. Such a film substrate could have an optionally selectable thickness, although that thickness is in the range of usually 5 μm to 200 μm, and preferably 10 μm to 50 μm.

There is no particular limitation on the substrate 6 on condition that it has some mechanical strength. For instance, the substrate 6 could be a PET film, a polyvinyl chloride (PVC) film, a polyvinylidene chloride film, a polyethylene film, a polypropylene film, a polycarbonate film, a cellophane film, an acetate film, a nylon film, a polyvinyl alcohol film, a polyamide film, a polyamide-imide film, an ethylene-vinyl alcohol copolymer film, a polymethyl methacrylate (PMMA) film, a polyether sulfone film, and a polyether ether ketone (PEEK) film. Such a substrate could have an optionally selectable thickness, although that thickness is in the range of usually 5 μm to 200 μm, and preferably 10 μm to 50 μm.

For the release layer 5, for instance, use could be made of a water-soluble resin, a hydrophilic resin, waxes, silicone wax, a silicone resin, a fluoro-resin, and an acrylic resin. The release layer could be formed with a thickness of usually about 0.5 to 5 μm.

It is noted that when the cholesteric liquid crystal layer 3 is formed, the orientation film A may or may not be provided in advance. With the orientation film A provided, liquid crystals coated on the orientation film A are placed in a planar orientation state; without the orientation film A, however, the liquid crystals would not. With the orientation film A provided, it is then possible to fabricate a label (medium) capable of mirror reflection, and without the orientation film A, it is then possible to fabricate a label (medium) that is well visible even from a somewhat oblique direction, because of being depending on the liquid crystals' own self-orientation and having scattering capability.

When the surface of the support substrate on the side to be coated with the liquid crystal composition has orientation capability, a diffusion control layer can be provided between the cholesteric liquid crystal layer and the support substrate if required, thereby controlling fluctuations of the orientation state of the cholesteric liquid crystal structure to control diffusion capability.

It is noted that for such a diffusion control layer, for instance, use could be made of modified acrylate, urethane acrylate, polyester acrylate, and epoxy resin.

Those resins used may be of a mono- or poly-functional type, and of a monomer or oligomer type as well.

Specific mention could be made of ethoxylated trimethylolpropane triacrylate, propoxylated glyceryl triacrylate, pentaerythritol tetraacrylate, ditrimethylolpropane tetraacrylate, dipentaerythritol-hydroxy pentaacrylate, ethoxylated pentaerythritol tetraacrylate, pentaacrylate ester, pentaerythritol triacrylate, trimethylolpropane triacrylate, trimethylolpropane PO-modified triacrylate, isocyanuric acid EO-modified triacrylate, trimethylolpropane EO-modified triacrylate, dipentaerythritol penta- and hexaacrylate, urethane adduct, aliphatic polyamine type epoxy resin, polyaminoamide type epoxy resin, aromatic diamine type epoxy resin, alicyclic diamine type epoxy resin, phenol resin type epoxy resin, amino resin type epoxy resin, mercaptan compound type epoxy resin, dicyanamide type epoxy rein, and Lewis acid complex compound type epoxy resin.

The steps for the lamination (fixation) of the cholesteric liquid crystal layer 3 (coating, orientating and curing steps) are now explained in great details.

Coating Step

At the coating step, a liquid crystalline composition of cholesteric order is coated thereby forming a cholesteric liquid crystal layer. The coating of the liquid crystalline composition here could be achieved by any one of existing coating techniques. Specifically, use could be made of roll coating, gravure coating, bar coating, slide coating, die coating, slit coating, and dipping. Coating with the so-called roll-to-roll system could be used, too.

It is noted that for the liquid crystalline composition to be coated, use could be made of chiral nematic liquid crystals of cholesteric order or cholesteric liquid crystals. There is no particular limitation on such a liquid crystal material with the proviso that it can form a cholesteric liquid crystal structure; however, a polymerizable liquid crystal material having polymerizable functional groups at both termini of molecule is particularly preferred to obtain the optically stable cholesteric liquid crystal layer 3 after curing.

An account is now given with reference to one specific case where chiral nematic liquid crystals are used as the liquid crystalline composition. Note here that the chiral nematic liquid crystal is a mixture of a polymerizable liquid crystal material of nematic order with a chiral agent. The chiral agent here is to control the spiral pitch length of the polymerizable liquid crystal material of nematic order, so that the liquid crystalline composition can have generally cholesteric order. Photopolymerization initiators and suitable additives could be added to such a liquid crystalline composition.

Exemplary liquid crystal materials of nematic order are compounds represented by the following general formula (1) or compounds represented by the following formulae (2-i) to (2-xi). Those compounds could be used alone or in admixture.

[chemical formula 1]

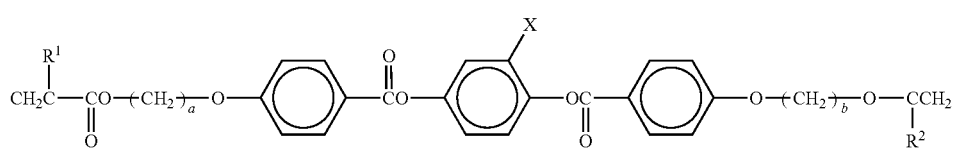

(1)

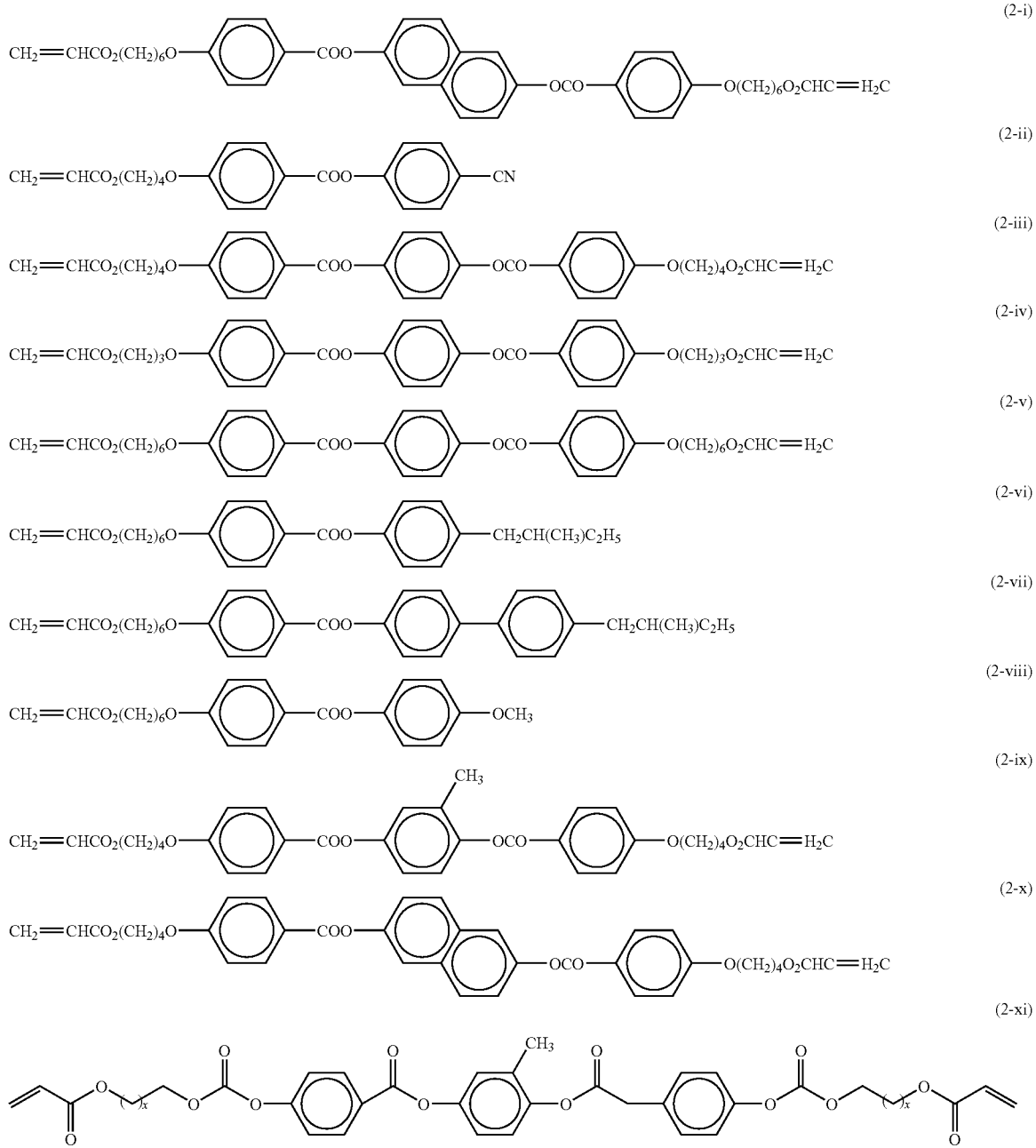

X = an integer of 2 to 5

In the aforesaid general formula (1), R1 and R2 are each hydrogen or a methyl group; however, both R1 and R2 are preferably hydrogen because there is a wide temperature range where there is a liquid crystal phase. X could be any one of hydrogen, chlorine, bromine, iodine, an alkyl group having 1 to 4 carbon atoms, a methoxy group, a cyano group or a nitro group; however, X is preferably chlorine or a methyl group. In the aforesaid general formula (1), a and b indicative of the chain length of an alkylene group that is a spacer between a (meth)acryloyloxy group and an aromatic ring at both termini of a molecular chain could be each an integer between 2 and 12; however, each should be in the range of 4 to 10, and preferably 6 to 9. Compounds of the general formula (1) with a=b=0 are lacking in stability, susceptible of hydrolysis, and of high crystallinity in itself. Compounds of the general formula (1) with a≧13 and b≧13 have a low isotropic transition temperature (TI) Thus, all such compounds are not preferred, because there is a narrow temperature range where there is a liquid crystal phase.

The case where the polymerizable liquid crystal monomer is used as the polymerizable liquid crystal material of nematic order has been explained, but of course, it is also possible to use a polymerizable liquid crystal oligomer, a polymerizable liquid crystal polymer, a liquid crystal polymer or the like. Such polymerizable liquid crystal oligomers and polymers, and such liquid crystal polymers could be selected from those proposed so far in the art.

On the other hand, the chiral agent is a low-molecular compound that has an optically active site and a molecular weight of primarily 1,500 or less. The main purpose of the chiral agent used is to induce a spiral structure into the positive uniaxial nematic order brought about by the polymerizable liquid crystal material of nematic order. As long as that purpose is accomplished, there is no particular limitation on the type of the low-molecular compound as the chiral agent; the requirement for the chiral agent is that it is compatible with the polymerizable liquid crystal material of nematic order in a solution or fused state, so that it can induce the desired spiral structure into the polymerizable liquid crystal material of nematic order without doing damage to its liquid crystallinity.

It is noted that the chiral agent used to induce the spiral structure into the liquid crystal as described above must have some chirality at least in its molecule. In other words, the chiral agent used here, for instance, includes a compound having one or two or more asymmetric carbon atoms, a compound having an asymmetric point on a heteroatom like a chiral amine or a chiral sulfoxide, or a compound having an optically active site having axial asymmetry like cumulene or binaphthol. More specifically, a commercially available chiral nematic liquid crystal (for instance, Chiral Dopant Liquid Crystal S-811 made by Merck Co., Ltd.) is mentioned.

Although depending on the property of the selected chiral agent, however, there is a possibility that the nematic order brought about by the polymerizable liquid crystal material of nematic order may break down with a drop of orientation. Further, when the chiral agent is incapable of polymerization, there is a possibility that the curing capability of the liquid crystalline composition may drop with a drop of the reliability of the post-curing film. Furthermore, the use of much chiral agent having an optically active site leads to a rise in the cost of the liquid crystalline composition. Accordingly, when forming a cholesteric liquid crystal layer having a cholesteric order with a short spiral pitch, a chiral agent having a lot stronger effect on the inducement of the spiral structure is preferably selected as the chiral agent having an optically active site, which is to be contained in the liquid crystalline composition. Specifically, it is preferable to use a low-molecular compound having axial asymmetry in its molecule such as those represented by the following general formulae (3), (4) or (5).

[chemical formula 3]

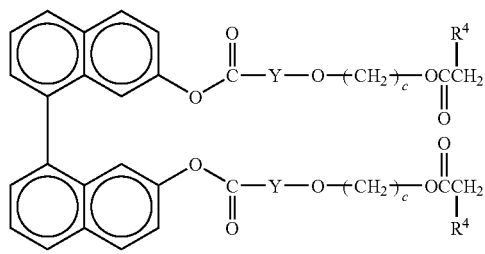

(3)

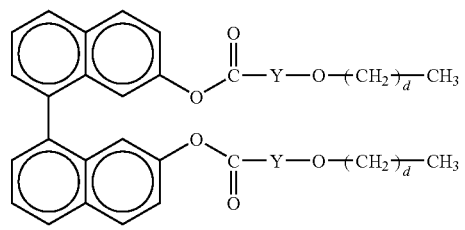

(4)

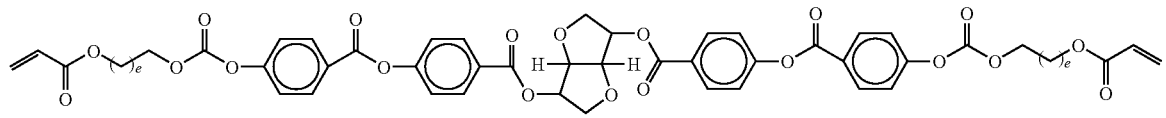

(5)

e = an integer of 2 to 5

[chemical formula 4]

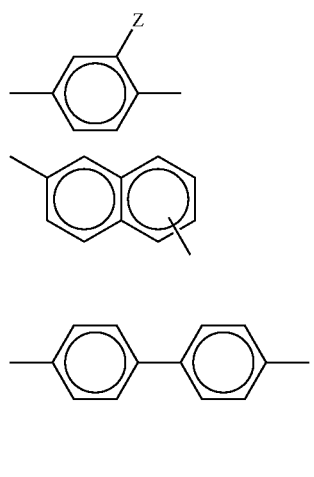

(i)

(iii)

(v)

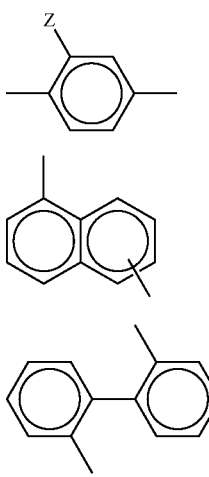

(ii)

(iv)

(vi)

-continued

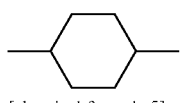

[chemical formula 5]

(vii)

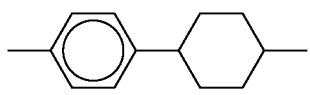 (viii)

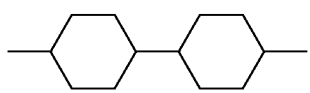 (x)

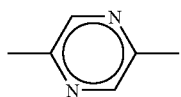 (xii)

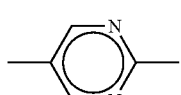 (xiv)

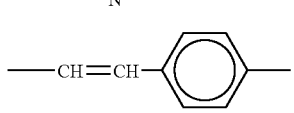 (xvi)

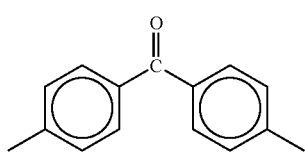 (xviii)

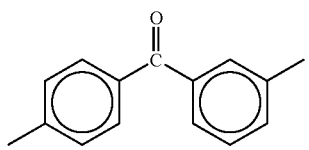 (xx)

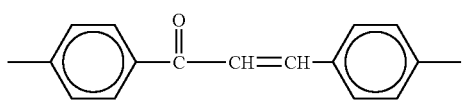 (xxii)

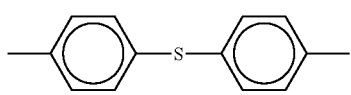 (xxiv)

(ix)

(xi)

(xiii)

(xv)

(xvii)

(xix)

(xxi)

(xxiii)

In the aforesaid general formula (3) or (4), R4 is hydrogen or a methyl group, and Y is any one of the aforesaid formulae (i) to (xxiv), and preferably any one of formulae (i), (ii), (iii), (v), and (vii). Small letters c and d could be each an integer of 2 to 12, preferably 4 to 10, and more preferably 6 to 9. Compounds of the aforesaid formula (3) or (4,) where the value of c or d is 0 or 1, are lacking in stability, susceptible of hydrolysis, and of high crystallinity. Compounds with the value of c or d being greater than 13, on the other hand, have a low melting point (Tm). Such compounds are less compatibility with the polymerizable liquid crystal material of nematic order, leading to a possibility that there may be a phase separation, although depending on concentrations.

It is noted that such a chiral agent is not necessarily of polymerizability. In view of heat stability or the like, however, it is very favorable for the chiral agent to have polymerizability, because it is polymerized with the polymerizable liquid crystal material of nematic order so that cholesteric order is stably fixed. In particular, the presence of polymerizable functional groups at both termini of the molecule works for the achievement of the cholesteric liquid crystal layer 3 of good heat resistance.

It is noted that the amount of the chrial agent contained in the liquid crystalline composition is optimized in consideration of the ability of the chiral agent to induce the spiral structure, the cholesteric liquid crystal structure of the finally obtained chloesteric liquid crystal layer, etc. Specifically, the amount of the chiral agent is selected from the range of 0.01 to 60 parts by weight, preferably 0.1 to 40 parts by weight, even more preferably 0.5 to 30 parts by weight, and most preferably 1 to 20 parts by weight per a total 100 parts by weight of the liquid crystalline composition, although varying largely with the material of the liquid crystalline composition used. When the content of the chiral agent is less than the aforesaid lower limit, it would often be impossible to give sufficient cholesteric order to the liquid crystalline composition. When the content of the chiral agent exceeds the aforesaid upper limit, there would be an impediment to the orientation of liquid crystal molecules, which would be likely to have adverse influence on the curing of liquid crystal molecules by active radiation or the like.

It is noted that the liquid crystalline composition could be coated as such; however, it is preferable to dissolve it in a suitable solvent such as an organic solvent into an ink formulation for the purpose of making its viscosity compatible with a coating machine, and achieving a good orientation state.

There is no particular limitation on such a solvent provided that such a polymerizable liquid crystal material as described above is soluble in it; however, it is preferable to use a solvent that does not erode the layer coated. Specific mention could be made of acetone, acetic acid-3-methoxybutyl, diglime, cyclohexanone, tetrahydrofuran, toluene, xylene, chlorobenzene, methylene chloride, and methyl ethyl ketone. There is no particular limitation on the degree to which the polymerizable liquid crystal material is diluted; however, it is preferable to dilute it to about 5 to 50%, and especially about 10 to 30% in consideration of the facts that the liquid crystal is essentially low in solubility and high in viscosity.

(Orientation Step)

At the coating step described above, the liquid crystalline composition is coated to form a cholesteric liquid crystal layer. Thereafter, at the orientation step, the cholesteric liquid crystal layer is held at a given temperature at which the cholesteric liquid crystal structure comes out to orientate liquid crystal molecules in the cholesteric liquid crystal layer.

It is noted that the cholesteric liquid crystal structure of the cholesteric liquid crystal layer 3 that is eventually obtained in the embodiment of the invention here is either in an orientation state where the directions of the spiral axes of multiple spiral structure areas vary within the layer, or in a planar orientation state. In either case, the orientation treatment is required; that is, what is needed for the former is an orientation treatment to form multiple spiral structure areas in the cholesteric liquid crystal structure, and what is needed for the latter is orientation treatment to form multiple spiral structure areas in the cholesteric liquid crystal structure, and orientation treatment to place the directors of liquid crystal molecules in the cholesteric liquid crystal structure well in a certain direction.

Here, as the cholesteric liquid crystal layer 3 is held at a given temperature at which the cholesteric liquid structure comes out, it allows the cholesteric liquid crystal layer to take on a liquid crystal phase where, due to the self-buildup action of liquid crystal molecules, there is a spiral structure formed, in which the directors of liquid crystal molecules rotate continuously in the thickness direction of the layer. If the cholesteric liquid crystal layer 3 has no diffusion capability, then the directions of liquid crystal molecules in the cholesteric liquid crystal structure are placed well in a certain direction. And then, the cholesteric liquid crystal structure that comes out in such a liquid crystal layer state is fixed by curing the cholesteric liquid crystal layer 3 by means of such techniques as described later.

It is noted that when the liquid crystalline composition coated on the cholesteric liquid crystal layer 3 contains a solvent, such an orientation step(s) is carried out usually with drying treatment for solvent removal. The drying temperature well fit for solvent removal is 40 to 120° C., and preferably 60 to 100° C., and the drying time (heating time) could be such that the cholesteric liquid crystal structure comes out and the solvent is substantially removed off, say, preferably 15 to 600 seconds, and more preferably 30 to 180 seconds. It is also noted that when the orientation state is found to be insufficient after drying, it is preferable to extend the heating time as desired. It is further noted that when vacuum drying is used for such drying treatment, it is preferable to carry out another heating treatment for orientation purposes.

(Curing Step)

After the orientation of liquid crystal molecules in the cholesteric liquid crystal layer 3 at the aforesaid orientation step, the cholesteric liquid crystal layer is cured to fix the cholesteric liquid crystal structure coming out in a liquid crystal phase.

At the curing step here, there could be some techniques used, say, (1) the drying of the solvent in the liquid crystalline composition, (2) the polymerization by heating of liquid crystal molecules in the liquid crystalline composition, (3) the polymerization of liquid crystal molecules in the liquid crystalline composition by irradiation with radiation, and (4) combinations of (1), (2), and (3).

Of those techniques, the technique (1) in particular is well fit for cases where a liquid crystal polymer is used as the polymerizable liquid crystal material of nematic order contained in the liquid crystalline composition that is the material for the cholesteric liquid crystal layer. This technique involves coating in a state wherein the liquid crystal polymer remains dissolved in a solvent such as an organic solvent; however, only solvent removal by drying treatment is needed to form a solidified cholesteric liquid crystal layer having cholesteric order. Note here that the type of the solvent, the drying conditions, etc. are the same as described with reference to the aforesaid coating and orientation steps.

In the aforesaid technique (2), the cholesteric liquid crystal layer is cured by the thermal polymerization of liquid crystal molecules in the liquid crystalline composition by means of heating. With this technique wherein the bound state of liquid crystal molecules changes with heating (firing) temperature, planar temperature variations of the cholesteric liquid crystal layer during heating would cause variations in physical properties such as film hardness and optical properties. To reduce the distribution of film thickness within ±10%, it is preferable to reduce the distribution of heating temperature within ±5%, especially ±2%, too.

There is no particular limitation on how to heat the formed cholesteric liquid crystal layer with the proviso that a uniform heating temperature be achievable. For instance, the cholesteric liquid crystal layer could be held in close contact with a heat plate, or parallel with a heat plate with a slight gap between them. Alternatively, the cholesteric liquid crystal layer could be rested in,. or passed through, a system like an oven with a generally uniformly heated particular space. It is here noted that such as when a film coater is used, it is preferable to extend a drying zone thereby making sure a long enough heating time.

In general, the heating temperature must be higher than 100° C., but lower than about 150° C. in consideration of the heat resistance of the substrate 1. However, when a film tailored with heat resistance in mind is used as the material for the support substrate, heating could be applied at a temperature higher than 150° C.

In the aforesaid technique (3), liquid crystal molecules in the liquid crystalline composition are photo-polymerized by irradiation with radiation to cure the cholesteric liquid crystal layer. For this technique, electron beams, ultraviolet radiation or the like could be optionally used depending on conditions. Usually, preference is given to ultraviolet radiation having a wavelength of 250 to 400 nm in view of ease of the system involved. Here note that when ultraviolet radiation is used, a photopolymerization initiator should preferably have been added to the liquid crystalline composition.

The photopolymerization initiator to be added into the liquid crystalline composition, for instance, includes benzyl (also called bibenzoyl), bezenzoin isobutyl ether, benzoin isopropyl ether, benzophenone, benzoyl benzoate, benzoyl methyl benzoate, 4-benzoyl-4'-methyldiphenyl sulfide, benzyl methyl ketal, dimethylaminomethyl benzoate, 2-n-butoxyethyl-4-dimethylaminobenzoate, p-dimethylaminobenzoic acid isoamyl, 3,3'-dimethyl-4-methoxybenzophenone, methylobenzoyl formate, 2-methyl-1-(4-(methylthio)phenyl)-2-morpholinopropan-1-one, 2-benzyl-2-dimethylamino-1-(morpholinophenyl)-butan-1-one, 1-(4-dodecylphenyl)-2-hydroxy-2-methylpropan-1-one, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. Note here that the photopolymerization initiator plus a sensitizer could be added in such a range as to be not detrimental to the objects of the invention.

It is noted that the amount of the photo-polymerization initiator to be added to the liquid crystalline composition is in the range of 0.01 to 20% by weight, preferably 0.1 to 10% by weight, and more preferably 0.5 to 5% by weight.

Through such a series of (coating, orientation and curing) steps as described above, it is possible to stack (fix) the single cholesteric liquid crystal layer 3 on the substrate 3.

III. Laminating Step

At this step, the volume hologram layer 2 formed at step I and the cholesteric liquid crystal layer 3 formed at step II are laminated together. For the lamination of two layers, there are two laminating techniques used: such as when a bondable substrate is used, both could be laminated together by way of the bondable substrate, and such as when no bondable substrate is used, both could be laminated together, making use of a suitable primer treated surface.

Figure 4:
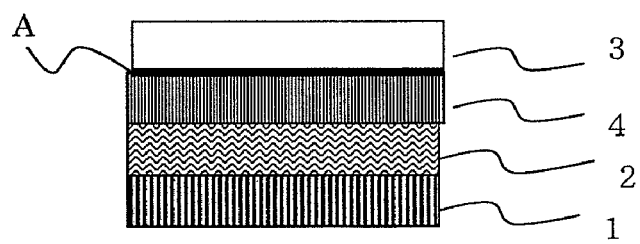
FIG. 4 is illustrative in section of a step of laminating together a volume hologram layer and a cholesteric liquid crystal layer.
Figure 5:
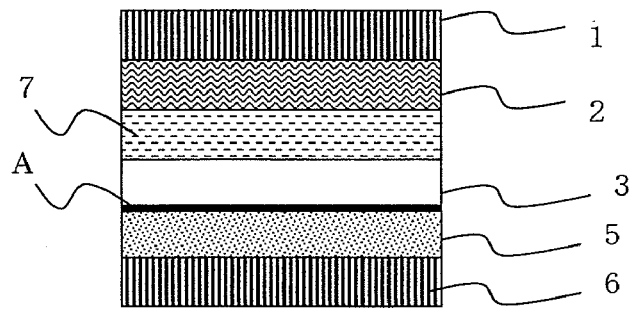
FIG. 5 is illustrative in section of a step of laminating together a volume hologram layer and a cholesteric liquid crystal layer.

FIG. 4 is illustrative of a state of both layers laminated together by the former technique, and FIG. 5 is illustrative of a state of both layers laminated together by the latter. Referring to FIG. 4, the volume hologram layer 2 and cholesteric liquid crystal layer 3 are laminated together by way of the bondable substrate 4, and referring to FIG. 5, they are laminated together, using the primer layer 7 provided on the cholesteric liquid crystal layer 3.

For the coating of one or more primer layers 7, for instance, a polyester resin, a polyurethane resin, an acrylic resin, an acryl polyol resin, and a vinyl chloride-vinyl acetate copolymer resin in a single or mixture form could be used, if necessary, with a reactive curing agent such as polyisocyanate, and titanate and/or a silane coupling agent.

Instead of providing the primer layer 7, it is also possible to primer treat the surface of the cholesteric liquid crystal layer 3. For instance, instead of providing the primer layer 7 on the surface of the cholesteric crystal layer 3, it could just as easily be subjected to bondable treatment, for instance, ion irradiation such as corona discharge, and plasma treatment; radiation irradiation such as irradiation with ultraviolet radiation, and electron beams; ozone treatment; frame treatment; preheating treatment; dust-proofing treatment; and alkaline treatment. Note here that such treatments could be applied alone or in combination of two or more.

At the laminating step in a specific fabrication process, the volume hologram layer 2 in a film form, unrolled from a roller, is first irradiated with laser light or the like, while it is in close contact with a holographic recording master, to record interference fringes in it. Immediately after a release of the holographically recorded volume hologram layer 2 from that master, it is laminated on the bondable substrate 4 with the cholesteric liquid crystal layer 3 formed or the primer layer 8 on the cholesteric liquid crystal layer 3, unrolled from another roller, or the like.

IV. Processing into Label or Transfer Foil

Figure 6:
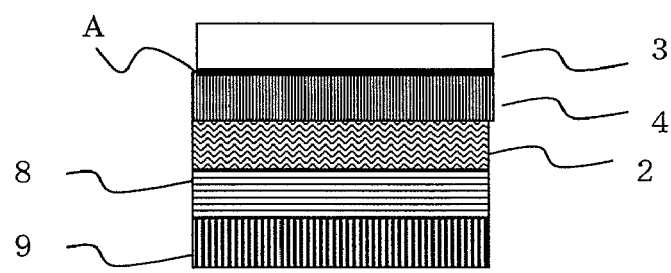
FIG. 6 is illustrative of a sectional structure of the cholesteric liquid crystal medium having a volume hologram layer, which has been processed into a label.
Figure 7:
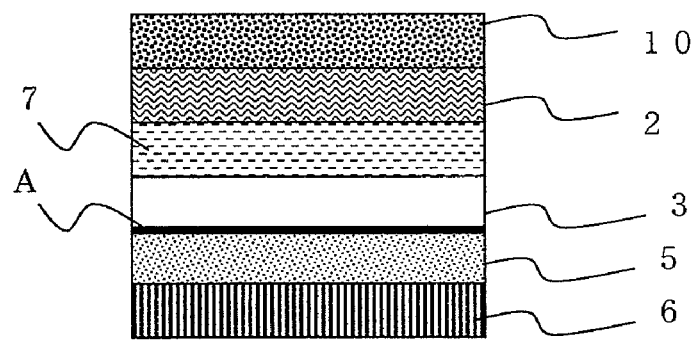
FIG. 7 is illustrative of a sectional structure of the cholesteric liquid crystal medium having a volume hologram layer, which has been processed into a transfer foil.

The thus laminated volume hologram 2 and cholesteric liquid crystal layer 3 are processed into a label or transfer foil for ease of handling. FIG. 6 is illustrative of the structure in section of the cholesteric liquid crystal medium having a volume hologram, which has been processed into a label, and FIG. 7 is illustrative of the structure in section of the cholesteric liquid crystal medium having a volume hologram, which has been processed into a transfer foil. More specifically, FIG. 6 is illustrative of the multilayer arrangement of FIG. 4, from which the substrate 1 is peeled off, and instead the adhesive layer 8 and a new substrate 9 are provided, and FIG. 7 is illustrative of the multilayer arrangement of FIG. 5, from which the substrate 1 is peeled off, and instead the heat seal layer 10 is provided. Although the processing of the multilayer arrangement of FIG. 4 into a label, and the processing of the multilayer arrangement of FIG. 5 into a transfer foil is now exemplified, it is noted that which processing is applied to which multilayer arrangement is an option.

Because the substrate 9 is going to be peeled off when the cholesteric liquid crystal medium having a volume hologram is applied to an application member, there is no particular limitation on it as long as it has a certain releasability off the adhesive layer 8 and a certain mechanical strength. For instance, use could be made of transparent films such as PET films, polyvinyl chloride (PVC) films, polyvinylidene chloride films, polyethylene films, polypropylene films, polycarbonate films, cellophane films, acetate films, nylon films, polyvinyl alcohol films, polyamide films, polyamide-imide films, ethylene-vinyl alcohol copolymer films, polymethyl methacrylate (PMMS) films, polyether sulfone films, and polyether ether ketone (PEEK) films.

Such a substrate film has a thickness in the range of usually 2 μm to 200 μm, and preferably 10 μm to 50 μm, although it is optionally selected depending on the application, type, etc. of the label.

(Processing into Label)

Reference is now made to the adhesive layer 8 used at the time of processing the cholesteric liquid crystal medium having a volume hologram into a label form. The adhesive layer 8 is to bond the cholesteric liquid crystal medium having a volume hologram to an application member. For instance, it could be obtained using an acrylic resin or an acrylic acid ester resin or their copolymer; styrene-butadiene copolymer, natural rubber, casein, gelatin, rosin ester, terpene resin, a phenol resin, a styrene resin, coumarone indene resin, polyvinyl ether, and a silicone resin; and an α-cyanoacrylate, silicone, maleimide, styrol, polyolefin, resorcinol, and polyvinyl ether adhesive. The adhesive layer 8 has preferably a thickness of 4 μm to 30 μm.

(Processing into Transfer Foil)

Reference is now made to the heat seal layer 10 used at the time of processing the cholesteric liquid crystal medium having a volume hologram into a transfer foil. The heat seal layer 10 is a layer adapted to bond the cholesteric liquid crystal medium having a volume hologram to an application medium by heating or otherwise treating that cholesteric liquid crystal medium in close contact with the application member thereby thermally transferring it onto the application member.

For such a heat-sensitive adhesive layer, for instance, use could be made of thermoplastic resins such as ethylene-vinyl acetate copolymer resin (EVA), polyamide resin, polyester resin, polyethylene resin, ethylene-isobutyl acrylate copolymer resin, butyral resin, polyvinyl acetate and its copolymer resin, a cellulose resin, polymethyl methacrylate resin, a polyvinyl ether resin, polyurethane resin, polycarbonate resin, polypropylene resin, epoxy resin, phenol resin, styrene-butadiene-styrene block copolymer (SBS), styrene-isoprene-styrene block copolymer (SIS), styrene-ethylene-styrene block copolymer (SEBS), and styrene-ethylene-propylene-styrene block copolymer (SEPS). Preferable among other is a layer capable of being heat sealed at a temperature lower than 180° C., although the most preferable is an ethylene-vinyl acetate (EVA) having an acetic acid content of at least 25%. If necessary, the above resin could be colored with a heat-sensitive adhesive layer.

VI. Other Processing Treatments

In addition to the above processing treatments into labels, and transfer foils, the present invention could just as easily make use of such various processing treatments as described below, alone or in combination of two or more.

(Pre-Processing 1 for the Adhesive Layer, etc.)

When the above label is fabricated, the substrate 1 is peeled off the volume hologram layer 2 and cholesteric liquid crystal layer 3, and instead, the adhesive layer 8 and new substrate 9 are successively provided. However, it is understood that if provision is previously made of a film having a three-layer structure comprising a substrate/adhesive (or heat seal) layer/separator film and the separator film is released off the three-layer structure film while the remaining two are laminated together, it is then possible to improve on the productivity of the cholesteric liquid crystal medium having a volume hologram.

(Pre-Processing 2 for the Adhesive Layer, etc.)

In some cases, the three-layer structure film comprising a substrate/adhesive (or heat seal) layer/separator film and the separator film—used for the pre-processing 1 for the adhesive layer, etc.—may be insufficient in terms of nerve and strength. In such cases, it is rather preferable to use a five-layer structure film comprising a substrate/adhesive (or heat seal) layer/reinforcing substrate film/adhesive (or heat seal) layer/separator film. When this five-layer layer is practically used, the separator film is peeled off as is the case with the precedent cases.

(Processing for the Protective Film)

Optionally in the invention, a protective layer could be provided between the necessary layers. For that protective layer, for instance, an acrylic resin, vinyl chloride-vinyl acetate copolymer resin, polyester resin, polymethacrylic acid ester resin, polyvinyl chloride resin, cellulose resin, silicone resin, chlorinated rubber, casein, various surfactants, and metal oxides could be used alone or in admixture of two or more. Among others, the most preference is given to a composition comprising an acrylic resin having a molecular weight of about 20,000 to 100,000 alone or in combination with a vinyl chloride-vinyl acetate copolymer resin having a molecular weight of 8,000 to 20,000, with 1 to 5% by weight of a polyester resin having a molecular weight of 1,000 to 5,000 being added as an optional additive. For the protective layer, it is also possible to use an ionizing radiation curable resin reacting with ultraviolet or electron radiation, a thermosetting resin, and a thermoplastic resin.

(Processing for the Release Layer)

Optionally in the invention, a release layer could be provided between the layers required to be good in terms of releasability. For the release layer, a water-soluble resin, a hydrophilic resin, waxes, silicone wax, silicone resin, fluororesin, acrylic resin or the like could be used. The release layer is formed usually with a thickness of about 0.5 to 5 µm.

VI. Shaping

The cholesteric liquid crystal medium having a volume hologram processed into a label or transfer foil form, as described above, is shaped into the end product.

Example 1

(1) Preparation of Multilayer Structure 1

Figure 8:
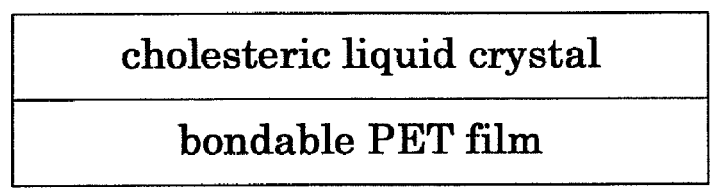
FIG. 8 is illustrative of a sectional structure at a fabrication process step of the cholesteric liquid crystal medium having a volume hologram layer according to the invention.

Cholesteric Liquid Crystal Layer/Double-Side Bondable Tape PET Film (See FIG. 8)

A cholesteric liquid crystal solution, with the composition mentioned below, was coated on the double-side bondable PET film (Cosmo Shine 4300 (50 µm) made by Toyobo Co., Ltd.) at a post-drying thickness of 4 µm by means of a bar coater, and then heated for orientation (drying) in an oven of 80° C.

| (Composition of the Cholesteric Liquid Crystal Solution) | |
|---|---|
| Main agent comprising an ultraviolet curing type nematic liquid crystal | (95.8 parts by weight) |
| Polymerizable chiral agent | (4.2 parts by weight) |
| Photopolymerization initiator (made by Chiba Specialty Chemicals Co., Ltd.) | (5 parts by weight) |
| Cyclohexanone | |

(2) Preparation of Multilayer Structure 2

Figure 9:
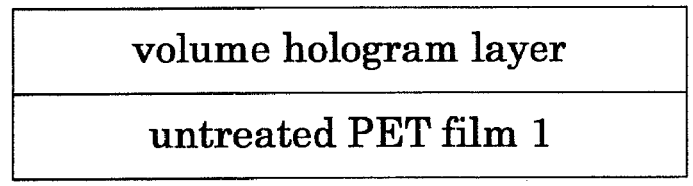
FIG. 9 is illustrative of a sectional structure at a fabrication process step of the cholesteric liquid crystal medium having a volume hologram layer according to the invention.

Volume Hologram Layer/Untreated PET Film 1 (See FIG. 9)

A volume hologram-recording solution, with the composition mentioned below, was coated on the untreated PET film 2 (Lumirror T60 (50 µm) made by Toray Co., Ltd.) at a post-drying thickness of 10 µm by means of an applicator, and thereafter dried in an oven of 90° C. to obtain a volume hologram-recording layer/untreated PET film 1.

| (Volume Hologram-Recording Solution) | |
|---|---|
| Polymethyl methacrylate (having a weight-average molecular weight of 200,000) | 100 parts by weight |
| 9,9-Bis(4-acryloxydiethoxyphenyl)fluorene | 80 parts by weight |
| 1,6-Hexanediol diglycidyl ether | 70 parts by weight |
| Diphenylidoniumhexafluoroantimonate | 5 parts by weight |

-continued

| (Volume Hologram-Recording Solution) | |
|---|---|
| 3,9-Diethyl-3'-carboxymethyl-2,2'-thiacarbocyanineidonium salt | 1 part by weight |
| Solvent (methyl ethyl ketone/1-butanol = 1/1 by weight) | 200 parts by weight |

While the surface of the volume hologram-recording layer of the resulting multilayer structure was in close contact with a hologram master, laser light (532 nm) was incident from the untreated PET film 2 side at 80 mJ/cm$^2$ to record a volume hologram in the volume hologram-recording layer.

(3) Preparation of Multilayer Structure 3

Figure 10:
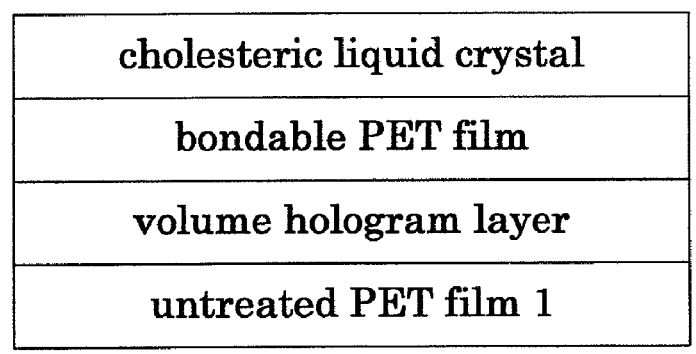
FIG. 10 is illustrative of a sectional structure at a fabrication process step of the cholesteric liquid crystal medium having a volume hologram layer according to the invention.

Cholesteric Cholesteric Liquid Crystal Layer/Double-Side Bondable PET Film/Volume Hologram Layer/Untreated PET Film 2 (See FIG. 10)

After the recording of the volume hologram to the multilayer structure 2, it was peeled off the hologram master, and the bondable PET surface of the multilayer structure 1 was laminated on the surface of the volume hologram layer to obtain the multilayer structure 3.

(4) Preparation of Multilayer Structure 4

Figure 11:
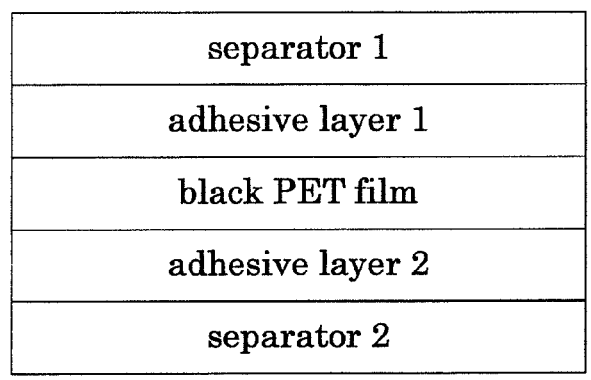
FIG. 11 is illustrative of a sectional structure at a fabrication process step of the cholesteric liquid crystal medium having a volume hologram layer according to the invention.

Separator 1/Adhesive Layer 1/Black PET Film/Adhesive Layer 2/Separator 2 (See FIG. 11)

An adhesive layer solution, with the composition mentioned below, was coated on the black PET film (Lumirror X30 (75 μm) made by Toray Co., Ltd.) at a post-drying thickness of 25 μm by means of an applicator, and thereafter dried in an oven of 100° C. to obtain an adhesive layer 1/black PET film.

| (Adhesive Layer Solution) | |
|---|---|
| Acrylic adhesive agent (Nissetsu PE-118 made by Nippon Carbide Industries Co., Ltd.) | 100 parts by weight |
| Isocyanate crosslinking agent (Nissetsu CK-101 made by Nippon Carbide Industries Co., Ltd.) | 2 parts by weight |
| Solvent (methyl ethyl ketone/toluene/ethyl acetate = 2/1/1 by weight) | 60 parts by weight |

After drying, the separator 1 (SPPET (38 μm) made by Tocelo Co., Ltd.) was laminated on the adhesive layer 1 surface to obtain a separator 1/adhesive layer 1/black PET film. Afterwards, the adhesive layer 2 (the solution was the same as in the adhesive layer 1) was formed on another surface of the black PET film in the same manner, and the separator 2 (SPPET (38 μm) made by Tocelo Co., Ltd.) was laminated on it to obtain the multilayer structure 4.

(5) Cholesteric Liquid Crystal Medium 1 Having a Volume Hologram Layer

Figure 12:
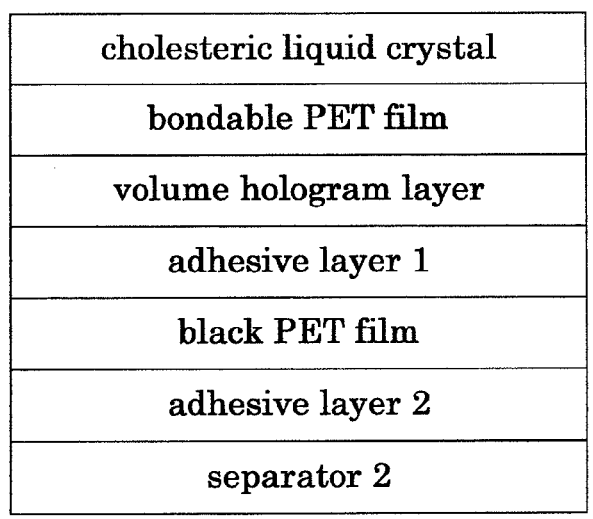
FIG. 12 is illustrative of a sectional structure of the cholesteric liquid crystal medium having a volume hologram layer fabricated according to the inventive process.

Cholesteric Liquid Crystal Layer/Double-Side Bondable PET Film/Volume Hologram Layer/Adhesive Layer 1/Black PET Film/Adhesive Layer 2/Separator 2 (See FIG. 12)

The untreated PET film of the multilayer structure 3 and the separator 1 of the multilayer structure 4 were peeled off, and the volume hologram surface and the adhesive layer 1 surface were laminated together to obtain the cholesteric liquid crystal medium 1 having a volume hologram.

Example 2

(1) Preparation of Multilayer Structure 5

Figure 13:
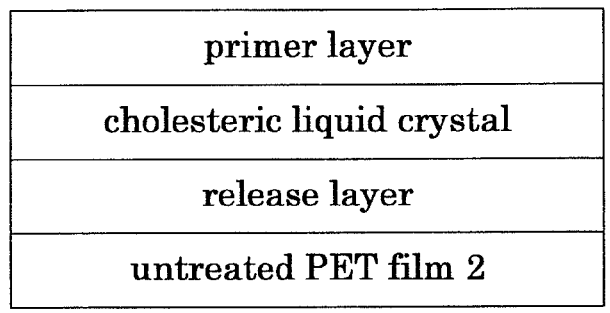
FIG. 13 is illustrative of a sectional structure of the cholesteric liquid crystal medium having a volume hologram layer fabricated according to the inventive process.

Primer Layer/Cholesteric Liquid Crystal Layer/Release Layer/Untreated PET Film 2 (See FIG. 13)

A release layer solution, with the composition mentioned below, was coated on the untreated PET film 2 (Lumirror 50T60 (50 μm) made by Toray Co., Ltd.) at a post-drying thickness of 0.8 μm by means of a bar coater, and thereafter dried in an oven to obtain a release layer.

| (Release Layer Solution) | |
|---|---|
| Silicone-modified acrylic resin (Celltop 226 made by Dicel Chemistries Co., Ltd.) | 16 parts by weight |
| Aluminum catalyst (Celltop CAT-A made by Dicel Chemistries Co., Ltd.) | 3 parts by weight |
| Solvent (methyl ethyl ketone/toluene = 1/1 by weight) | 16 parts by weight |

On that, the cholesteric liquid crystal solution used for the multilayer structure 1 was processed as was the case with the multilayer structure 1. On that, a primer layer, with the composition mentioned below, was coated at a post-drying thickness of 1 μm by means of a bar coater, and thereafter dried to obtain the multilayer structure 5.

| (Primer Layer) | |
|---|---|
| Acrylic resin (BR-87 made by Mitsubishi Rayon Co., Ltd.) | 50 parts by weight |
| Solvent (methyl ethyl ketone/toluene = 1/1 by weigth) | 50 parts by weight |

(2) Preparation of Multilayer Structure 6

Figure 14:
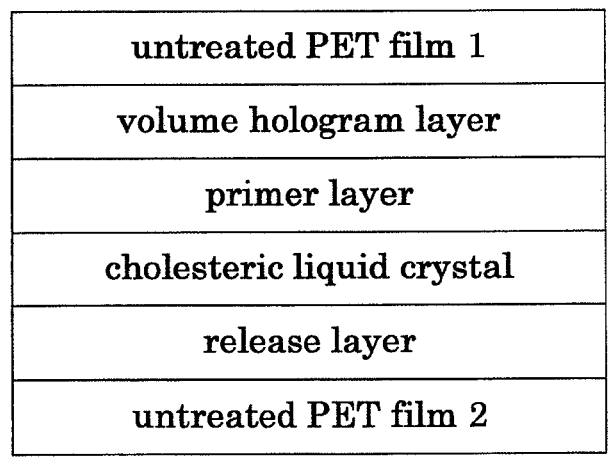
FIG. 14 is illustrative of a sectional structure of the cholesteric liquid crystal medium having a volume hologram layer fabricated according to the inventive process.

Untreated PET Film 1/Volume Hologram Layer/Primer Layer/Cholesteric Liquid Crystal Layer/Release Layer/Untreated PET Film 2 (See FIG. 14)

After the recording of the hologram in the multilayer structure 2, the multilayer structure 2 was peeled off the hologram master, and the primer layer of the multilayer structure 5 was laminated on the volume hologram layer surface. Then, heating and fixation by and exposure to ultraviolet radiation gave the multilayer structure 6.

(3) Cholesteric Liquid Crystal Medium 2 Having A Volume Hologram

Figure 15:
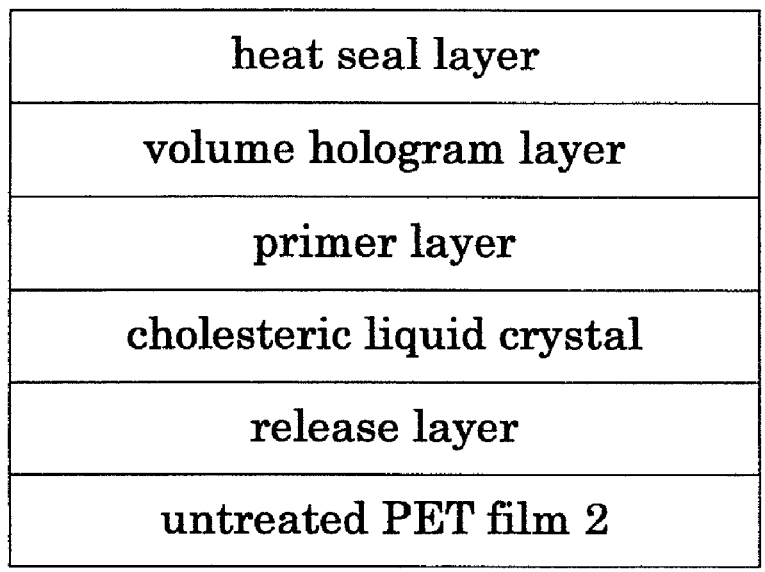
FIG. 15 is illustrative of a sectional structure of the cholesteric liquid crystal medium having a volume hologram layer fabricated according to the inventive process.

Heat Seal Layer/Volume Hologram Layer/Primer Layer/Cholesteric Liquid Crystal Layer/Release Layer/Untreated PET Film 2 (See FIG. 15)

After a release of the untreated PET film 1 off the multilayer structure 5, a heat seal layer solution, with the composition mentioned below, was coated on it at a post-drying thickness of 4 μm by means of a bar coater, and thereafter dried in an oven to obtain the cholesteric liquid crystal medium 2 having a volume hologram layer.

| (Heat Seal Layer Solution) | |
|---|---|
| Polyester resin (Bylonal MD1985 made by Toyobo Co., Ltd.) | 100 parts by weight |
| Solvent (water/isopropyl alcohol = 1/1 by weight) | 100 parts by weight |

We claim:

1. A fabrication process for a cholesteric liquid crystal medium having a volume hologram, which has a double-layer structure of a volume hologram layer and a cholesteric liquid crystal layer, characterized by comprising steps of:
    forming a volume hologram layer on a first substrate;
    forming a cholesteric liquid crystal layer on a bondable substrate;
    applying said volume hologram layer on a surface of said bondable substrate having no said cholesteric liquid crystal layer applied thereon;
    peeling said first substrate off;
    forming a heat seal layer on a surface of said volume hologram layer, off which said first substrate has been peeled; and
    providing a third substrate on said adhesive layer.

2. A fabrication process for a cholesteric liquid crystal medium having a volume hologram, which has a double-layer structure of a volume hologram layer and a cholesteric liquid crystal layer, characterized by comprising steps of:
    forming a volume hologram layer on a first substrate;
    forming a release layer on a second substrate;
    forming a cholesteric liquid crystal layer on said release layer;
    forming a primer layer on said cholesteric liquid crystal layer;
    peeling said first substrate off; and
    forming a heat seal layer on a surface of said volume hologram layer, off which said first substrate has been peeled.

* * * * *